United States Patent
Frank et al.

(10) Patent No.: US 10,627,214 B2
(45) Date of Patent: Apr. 21, 2020

(54) METHOD FOR ELECTRONICALLY ANALYZING A SIGNAL CHANGING OVER TIME

(71) Applicant: Nanofocus AG, Oberhausen (DE)

(72) Inventors: Johannes Frank, Köln (DE); Gerd Jakob, Essen (DE); Michael Spengler, Gelsenkirchen (DE)

(73) Assignee: Nanofocus AG, Oberhausen (DE)

( * ) Notice: Subject to any disclaimer, the term of this patent is extended or adjusted under 35 U.S.C. 154(b) by 128 days.

(21) Appl. No.: 16/068,679

(22) PCT Filed: Jan. 6, 2017

(86) PCT No.: PCT/EP2017/050241
§ 371 (c)(1),
(2) Date: Jul. 9, 2018

(87) PCT Pub. No.: WO2017/118717
PCT Pub. Date: Jul. 13, 2017

(65) Prior Publication Data
US 2019/0025044 A1  Jan. 24, 2019

(30) Foreign Application Priority Data

Jan. 8, 2016 (DE) .......... 10 2016 100 261

(51) Int. Cl.
*G01B 11/02* (2006.01)
*G02B 21/00* (2006.01)

(52) U.S. Cl.
CPC ........ *G01B 11/026* (2013.01); *G02B 21/0024* (2013.01)

(58) Field of Classification Search
CPC .......................... G01B 11/026; G02B 21/0024
See application file for complete search history.

(56) References Cited

U.S. PATENT DOCUMENTS

2003/0137669 A1  7/2003  Rollins et al.
2015/0023445 A1*  1/2015  Camuffo .......... H03F 1/02
                                              375/268

FOREIGN PATENT DOCUMENTS

DE  248893  8/1987
EP  1589352  10/2005
EP  2693201  2/2014

OTHER PUBLICATIONS

International Search Report and Written Opinion dated Apr. 11, 2017 from the International Searching Authority Re. Application No. PCT/EP2017/050241. (10 pages).

* cited by examiner

*Primary Examiner* — Jamil Ahmed

(57) ABSTRACT

The invention relates to a method for electronically analyzing a time-variant signal ($U_e(t)$) having at least one extreme value, the amplitude and time of which are to be detected, by means of a detection circuit that operates as a peak value store and follows the time-variant signal after a threshold value ($U_s$) is exceeded until the maximum amplitude is reached, wherein exceedance of the extreme value results in a peak indicator signal ($U_{si}(t)$) being generated and the maximum amplitude being stored, which is characterized in that to capture more than one extreme value in the time-variant signal, the tracking of the signal (Ue(t)) is deactivated after production of the first peak indicator signal and after a drop below the threshold value and, after the signal exceeds the threshold value again as time progresses, further tracking of the signal ($U_e(t)$) is activated until the next extreme value to be detected is reached and a further peak indicator signal ($U_{si}(t)$) is generated and this further maximum amplitude is stored, and the two stores are read and reset at the end of the measurement cycle.

11 Claims, 2 Drawing Sheets

METHOD FOR ELECTRONICALLY ANALYZING A SIGNAL CHANGING OVER TIME

RELATED APPLICATIONS

This application is a National Phase of PCT Patent Application No. PCT/EP2017/050241 having International filing date of Jan. 6, 2017, which claims the benefit of priority of German Patent Application No. 10 2016 100 261.5 filed on Jan. 8, 2016. The contents of the above applications are all incorporated by reference as if fully set forth herein in their entirety.

FIELD AND BACKGROUND OF THE INVENTION

The invention relates to a method for electronically analyzing a time-variant signal having at least one extreme value, the amplitude and time of which are to be detected, by means of a detection circuit that operates as a peak value store and follows the time-variant signal after a threshold value is exceeded until the maximum amplitude is reached, wherein exceedance of the extreme value results in a peak indicator signal being generated and the maximum amplitude being stored.

In principle, a similar method is known from DD 248 893 A1. However, this document has no provision for taking into consideration a threshold value during the analysis. In this respect, this previously known method cannot be used to exclude noise and interference signals or peaks below a desired sensitivity threshold from the measurement from the outset. The signal tracker arrangement follows the input signal up to the maximum value thereof. Encountering of local maxima having a lower amplitude has no effect during the tracking. However, it follows every further rise in the signal to the highest maximum.

To capture not only the absolute value of the maximum but also the time at which it occurs, a peak indicator signal is generated whenever the rising signal is followed by a signal drop, which means encountering of a local maximum. This may be a square wave pulse, for example.

Comparison with a threshold value achieves the effect that the tracker mechanism is not activated until the threshold value is exceeded. Therefore, noise peaks and interference signals below the threshold value are not detected. The method presupposed to be known fails, however, if more than one extreme value is intended to be determined locally and with precise timing in the measurement cycle, since—as explained above—only the extreme value having the highest amplitude is ascertained in the previously known method.

SUMMARY OF THE INVENTION

The invention is therefore based on the object of operating a method of the type cited at the outset such that the disadvantages of the prior art are overcome and any number of relevant signal peaks can be detected.

The invention achieves this object according to the characterizing part of claim 1 in that to capture more than one extreme value in the time-variant signal, the tracking of the input signal is deactivated after production of the first peak indicator signal after a drop below the threshold value and, after the signal exceeds the threshold value again as time progresses, further tracking of the signal is activated until the next extreme value to be detected is reached and a second peak indicator signal is generated and the second maximum amplitude is stored, and the two stores are read and reset at the end of the measurement cycle.

However, the technical embodiment of the invention also permits the second or further peak value store to be deactivated, so that the method can operate in the known mode described above.

The peak indicators are electrical signals that serve as triggers for the subsequent signal processing, during which a piece of position information is assigned to the time of the peak indicator. The peak indicators used can be current or voltage pulses or edges. In the specific implementation, narrow square wave pulses are produced.

Since the method involves multiple peak indicators being produced, this requires the possibility of distinction between the trigger signals that are to be transmitted, so that allocation to peak value store 1 and peak value store 2 is possible. This is required for the subsequent evaluation. Distinction criteria may be the amplitude of the peak indicator, its length of time or other features such as its shape, etc.

The peak indicators are supplied to subsequent evaluation electronics that determine the timing differences between the occurrence of the indicators.

According to an advantageous development of the invention, there is provision according to claim 5 for multiple signal evaluations to be performed at the same time in parallel and the respective temporal signals to be detected in multiple channels and the detected maxima to be evaluated in multiple channels.

According to claim 6, it is conceivable, by way of example, for the method to be used to detect signals from backscattered electromagnetic waves that allow attainment of the distance from an interface.

In this case, according to claim 7, the time-variant signal detected can be the light intensity during an optical measurement process.

These optical measurement methods are used to detect distances from surfaces quickly.

By means of the method according to the invention, it is furthermore possible, according to claim 9, that for coated substrates the distance from the layer and from the substrate is detected.

To increase the measurement speed, there is provision according to claim 10 for an optical sensor having an ultrafast focusable acousto-optical lens to be used.

In this case, the acousto-optical lens can be used to produce time-variant signals in measurement cycles at repetition rates of above 1 MHz and the method is used to evaluate said signals.

BRIEF DESCRIPTION OF THE SEVERAL VIEWS OF THE DRAWINGS

The invention is depicted and explained below on the basis of drawings, in which.

DESCRIPTION OF SPECIFIC EMBODIMENTS OF THE INVENTION

Figure 1:
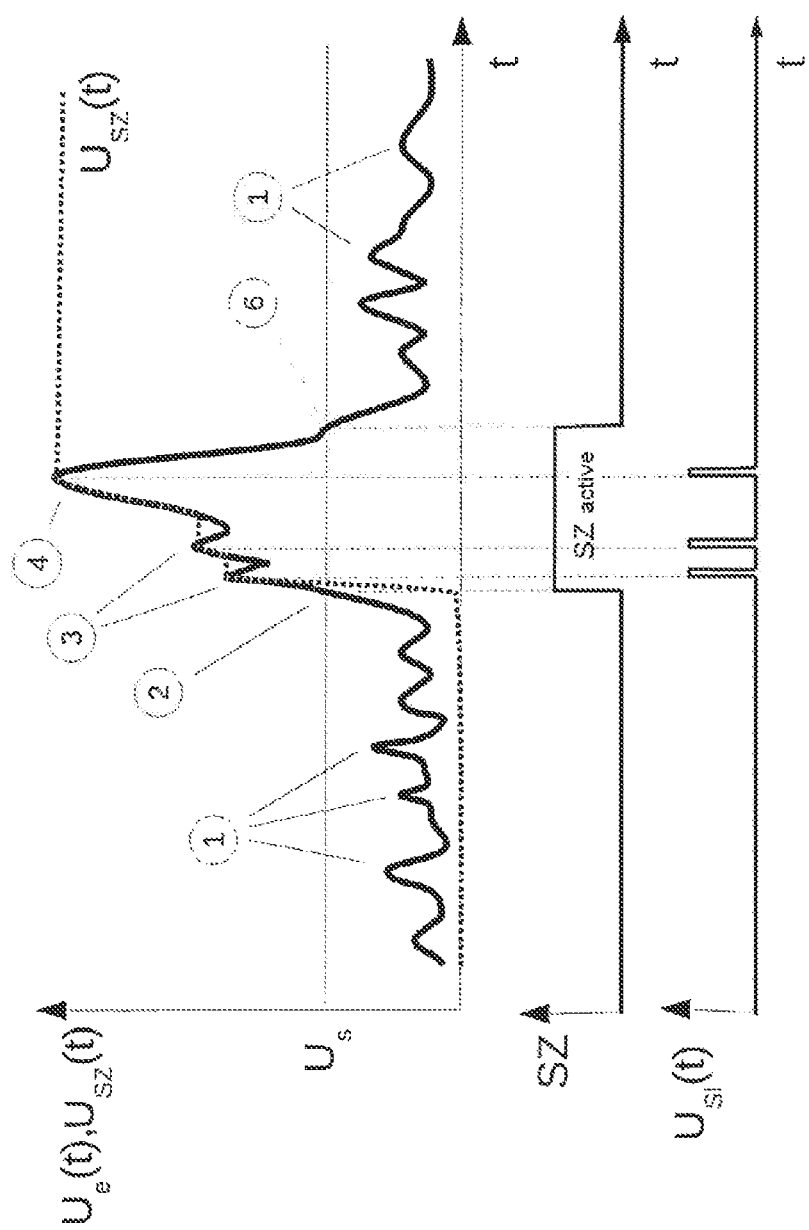
FIG. 1: shows the principle of a signal tracking method using a peak value store

FIG. 1 depicts the principle of extreme value detection with tracking of a time-variant input signal $U_e(t)$.

Such tracking can be realized for electrical voltage profiles as a capacitor that is charged by an input signal via a diode and discharged again by means of resetting electronics. In FIG. 1, a time-variant signal ($U_e(t)$) is supplied to the tracking. The output signal $U_{sz}(t)$ follows this input signal up to the maximum value thereof. The encountering of local maxima with subsequent drop in the input voltage does not affect the tracking voltage. However, it follows any further increase in the signal up to the highest maximum.

In order to capture not only the absolute value of the maximum but also the time of its occurrence, a peak indicator signal $U_{si}(t)$ is generated whenever a rising signal $U_e(t)$ is followed by a signal drop. This may be a square wave pulse, as shown in FIG. 1.

Comparison with a threshold value $U_{sw}$ achieves the effect that the tracker mechanism is not activated until the threshold value is exceeded.

In this case, different threshold values can also be prescribed so that the weaker signal can be evaluated selectively, for example.

This one tracking can only be used to detect the highest extreme value in the signal profile, however.

Figure 2:
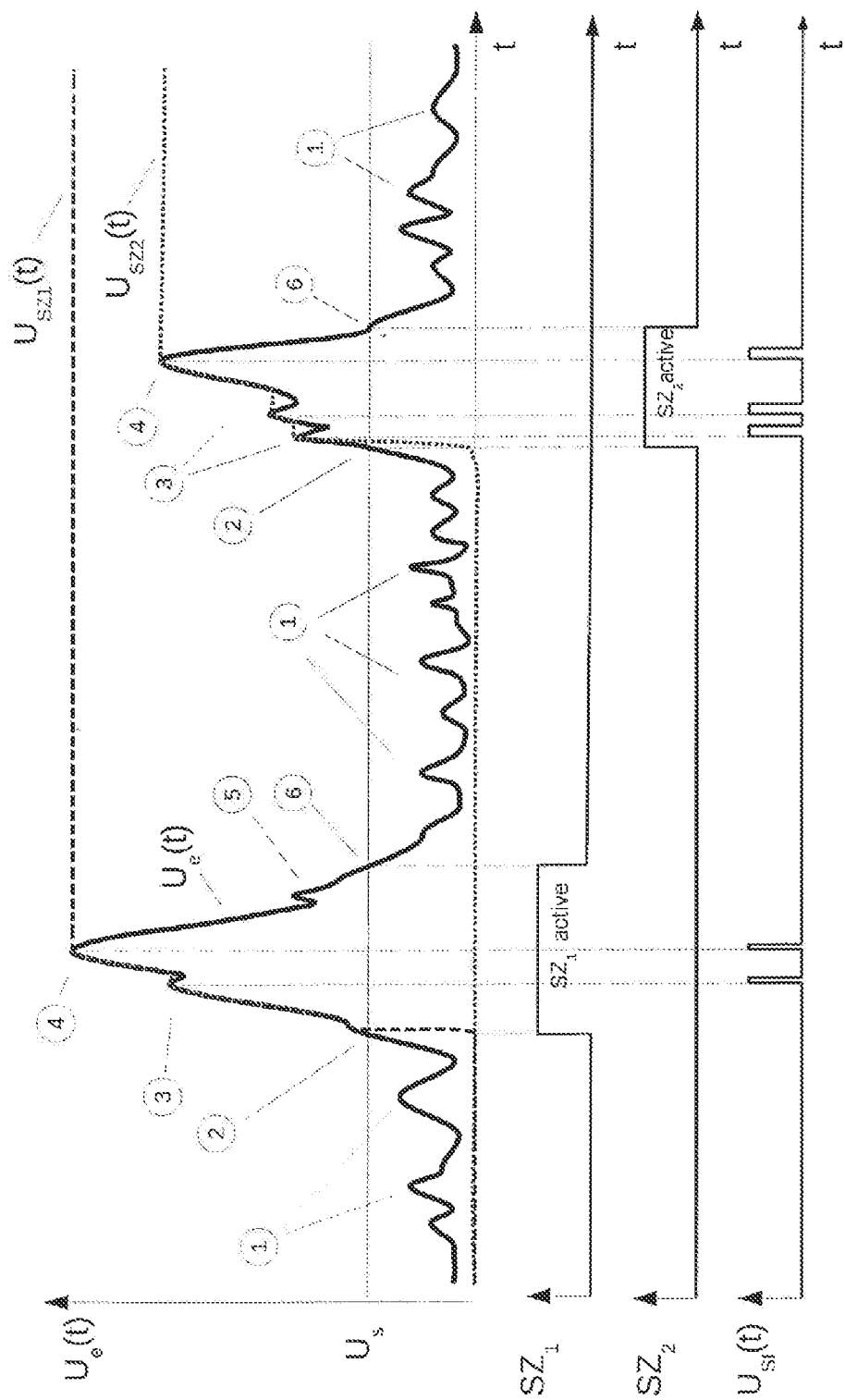
FIG. 2: shows the principle of a signal tracking method using two peak value stores

FIG. 2 depicts the circumstances when encountering of a measurement window can result in two useful signals (4) arising and needing to be captured separately. This is accomplished using two peak value stores. When the threshold value is first exceeded, the first peak value store is activated and pulses are generated in the peak indicator, as described above. Following a drop below the threshold value and its being exceeded again, the second peak value store is activated. Again, pulses are generated in the peak indicator if a local peak is encountered.

In order to be able to allocate the pulses in the signal $U_{si}(t)$ to the first and second peak value stores, pulses having different widths are generated for the activated peak value stores 1 and 2. These can also be distinguished using the height of the pulse, the shape or other features or codings. In the figures, the reference sign 4 denotes the useful signal, which is the highest peak in the noisy signal, whose amplitude and occurrence are intended to be captured.

The reference sign 1 denotes noise peaks that are not captured and also generate no pulse in the peak indicator signal $U_{si}(t)$, since they are below the threshold value $U_{sw}$.

The reference sign 2 denotes the point at which the input signal $U_e(t)$ exceeds the threshold value $U_{sw}$. The peak value store is activated and, if local maxima are exceeded, pulses are generated in the peak indicator signal $U_{si}(t)$.

The reference sign 3 in the figures denotes local noise peaks that are above the threshold value $U_{sw}$, the occurrence of said noise peaks resulting in a pulse being generated in the peak indicator signal $U_{si}(t)$.

The reference sign 5 denotes a local noise peak for which no pulse is generated in the $U_{si}(t)$, since its level does not exceed the level of the useful signal 4.

At the reference sign 6, the input signal $U_e(t)$ drops below the threshold value $U_{sw}$. The peak value store holds onto its value until it is read and reset at the start of a new measurement cycle. The generation of pulses for further local peaks is deactivated. In a system for capturing two or more useful signal peaks, the next peak value store is activated when the threshold value is exceeded again.

What is claimed is:

1. A method for electronically analyzing a time-variant signal ($U_e(t)$) having at least one extreme value, the amplitude and time of which are to be detected, by means of a detection circuit that operates as a peak value store and follows the time-variant signal after a threshold value ($U_s$) is exceeded until the maximum amplitude is reached, wherein exceedance of the extreme value results in a peak indicator signal ($U_{si}(t)$) being generated and the maximum amplitude being stored,
characterized
in that to capture more than one extreme value in the time-variant signal, the tracking of the signal (Ue(t)) is deactivated after production of the first peak indicator signal and after a drop below the threshold value and, after the signal exceeds the threshold value again as time progresses, further tracking of the signal ($U_e(t)$) is activated until the next extreme value to be detected is reached and a further peak indicator signal ($U_{si}(t)$) is generated and this further maximum amplitude is stored, and the two stores are read and reset at the end of the measurement cycle.

2. The method as claimed in claim 1, characterized in that more than two extreme values are detected by activation of further voltage tracking operations.

3. The method as claimed in claim 2, characterized in that the respective peak indicator signals ($U_{si}(t)$) are distinguishable on the basis of type, shape, pulse height and pulse width.

4. The method as claimed in claim 1, characterized in that the signal ($U_e(t)$) to be detected is tracked by virtue of a capacitor being charged via a diode until the maximum value is reached and being actively reset by means of reset electronics after production of one or more peak indicator signals ($U_{si}(t)$).

5. The method as claimed in claim 1, characterized in that multiple signal evaluations are performed at the same time in parallel and the respective temporal signals are detected in multiple channels and the detected maxima are evaluated in multiple channels.

6. The method as claimed in claim 1, characterized in that it is used to detect signals from backscattered electromagnetic waves that allow ascertainment of the distance from an interface.

7. The method as claimed in claim 1, characterized in that the time-variant signal detected is the light intensity during the optical measurement process.

8. The method as claimed in claim 7, characterized in that optical measurement methods are used to detect distances from surfaces quickly.

9. The method as claimed in claim 1, characterized in that for coated substrates the distance from the layer and from the substrate is detected.

10. The method as claimed in claim 1, characterized in that an optical sensor having an ultrafast focusable acousto-optical lens is used.

11. The method as claimed in claim 10, characterized in that the acousto-optical lens is used to produce time-variant signals in measurement cycles at repetition rates of above 1 MHz and the method is used to evaluate said signals.

* * * * *